(12) United States Patent
Yagawa (10) Patent No.: US 7,483,445 B2
(45) Date of Patent: Jan. 27, 2009

(54) CDMA BASE STATION APPARATUS

(75) Inventor: Kenichiro Yagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 947 days.

(21) Appl. No.: 10/815,949

(22) Filed: Apr. 2, 2004

(65) Prior Publication Data

US 2004/0202118 A1 Oct. 14, 2004

(30) Foreign Application Priority Data

Apr. 10, 2003 (JP) .............................. 2003-106463

(51) Int. Cl.
*H04B 1/40* (2006.01)
(52) U.S. Cl. ..................... 370/463; 370/335; 455/561
(58) Field of Classification Search ................ 370/340, 370/342, 345, 347, 350, 463, 458, 328, 335, 370/337, 466; 455/561
See application file for complete search history.

(56) References Cited

U.S. PATENT DOCUMENTS

| 5,896,568 | A | * | 4/1999 | Tseng et al. | ............. | 455/422.1 |
|---|---|---|---|---|---|---|
| 5,953,668 | A | * | 9/1999 | Reilly | ........................ | 455/442 |
| 6,587,448 | B1 | * | 7/2003 | Dajer et al. | ................. | 370/335 |
| 2002/0123365 | A1 | * | 9/2002 | Thorson et al. | ............. | 455/524 |
| 2003/0027591 | A1 | * | 2/2003 | LaGrotta et al. | ............. | 455/561 |

2003/0027597 A1 2/2003 La Grotta et al.

FOREIGN PATENT DOCUMENTS

| JP | 55071345 A | 5/1980 |
|---|---|---|
| JP | 2001-94509 | 4/2001 |
| JP | 2001-345754 | 12/2001 |

OTHER PUBLICATIONS

Office Action from German Patent Office with English translation issued on August 1, 2007.
"Ericsson: Recapitulation of the IPDL positioning method", Apr. 18-20, 1999, 10 pages, TSG-RAN Working Group 1 meeting #4, TSGR 1#4(99)346.

* cited by examiner

*Primary Examiner*—Blane J Jackson
(74) *Attorney, Agent, or Firm*—Young & Thompson (57) ABSTRACT

To enable CPU-to-CPU communication without requiring a special circuit between a baseband signal processing panel and RF signal processing panels, and to allow transmission of reference frame, frame timing and reference clock without requiring other physical interface. According to a W-CDMA base station apparatus of the present invention, in a baseband signal processing panel 110, at least one signal of a CPU-to-CPU communication signal, a frame timing signal, signals indicating frame number and the reference clock are multiplexed into a baseband signal and transmitted to RF panels $120_1$ to $120_n$. In the RF panels $120_1$ to $120_n$, at least one signal of signals such as the frame-timing signal, CPU-to-CPU communication signal, and the like is multiplexed with a demodulated digital signal and transmitted to the BB panel 110.

6 Claims, 3 Drawing Sheets

CDMA BASE STATION APPARATUS

FIELD OF THE INVENTION

The present invention relates to a CDMA (Code Division Multiple Access) base station apparatus having a baseband signal processing panel (unit) for performing baseband signal processing and a plurality of RF signal processing panels (units) for performing RF signal processing. More specifically, the invention relates to a W-CDMA (Wide band-CDMA) base station apparatus that employs a W-CDMA communication system, which is one of CDMA communication systems.

BACKGROUND OF THE INVENTION

In conventional CDMA base station apparatuses, an analog transmission system was employed for communication between the baseband signal processing panel and an RF signal processing panel (mainly constituted of an amplifier) (refer to Patent Documents 1 and 2, for example).

SUMMARY OF THE DISCLOSURE

[Patent Document 1]
Japanese Patent Kokai Publication No. JP-P2001-94509A

[Patent Document 2]
Japanese Patent Kokai Publication No. JP-P2001-345754A

However, in order to perform communication between CPUs of the panels according to the analog transmission system, a further physical interface was required, and a special circuit for this purpose was required. Further, it was difficult to transmit reference frame timing, a frame number, and reference clock, and for this reason as well, a still further physical interface was required. This does not become a so serious problem when a distance between the baseband signal processing panel and the RF signal-processing panel is short. However, when the distance is long, this offers a serious problem.

In the conventional W-CDMA base station apparatus described above, the baseband signal processing panel and the plurality of RF signal processing panels are connected according to the analog transmission system. Thus, following problems were encountered:
(1) The special circuit is required so as to perform communication between CPUs of the panels.
(2) A further physical interface is required to transmit the reference frame timing, frame number, and reference clock.

An object of the present invention to provide a CDMA base station apparatus that enables CPU-to-CPU communication between a baseband signal processing panel and RF signal processing panels without requiring a special circuit and can also transmit reference frame, frame timing, and reference clock, without requiring other physical interface.

In order to achieve the objects described above, in a CDMA base station apparatus according to the present invention comprising a baseband signal processing unit for performing baseband signal processing and a plurality of RF signal processing units for performing RF signal processing, the baseband signal processing unit and the plurality of RF signal processing units are connected by cables capable of transmitting a digital signal bidirectionally;

the baseband signal processing unit multiplexes at least one signal of a CPU-to-CPU communication signal, a frame timing signal, frame number, and a reference clock with a baseband signal, for transmission to each of the plurality of RF signal processing units; and the plurality of RF signal processing units each multiplexes at least one signal of the frame timing signal and the CPU-to-CPU communication signal with a demodulated digital signal, for transmission to the baseband signal processing unit.

In the CDMA base station apparatus according to the present invention, the baseband signal processing unit for performing baseband signal processing and each of the plurality of RF signal processing units for performing RF signal processing are connected by the cable, and interfacing by a high-speed digital signal in the bi-directional direction can be performed. Further, the baseband signal processing unit multiplexes at least one signal of the CPU-to-CPU communication signal, frame timing signal, and signals indicating the frame number, reference clock, and the like into the baseband signal, for transmission to each of the RF signal processing units. The plurality of RF signal processing units multiplexes at least one of the frame timing signal, CPU-to-CPU communication signal, and the like into the demodulated digital signal, for transmission to the baseband signal processing unit.

Accordingly, CPU-to-CPU serial communication between the baseband signal processing unit and each of the RF signal processing units using a UART, HDLC, or the like can be performed without requiring a special circuit. Thus, status monitoring and various controls over the counterpart unit can be easily performed. Thus, transmission of the frame timing signal, frame number and reference clock used as references can be performed between the baseband signal processing unit and the plurality of RF signal processing units without requiring other physical interface.

In the CDMA base station apparatus according to another aspect of the present invention, the baseband signal-processing unit includes:

a baseband signal processing section for performing baseband processing on digital data for downward transmission and baseband processing on digital data for upward transmission;

a channelization coding processing section for performing channelization coding on digital data for downward transmission, generated by the basband signal processing section;

a scramble coding processing section for performing scramble coding on digital data which has undergone channelization coding by the channelization coding processing section;

a CPU-to-CPU communication serial controller for generating the CPU-to-CPU communication signal for performing CPU-to-CPU serial communication with respective CPUs of the plurality of RF signal processing units;

a frame timing generating section for generating the frame timing signal;

a frame number generating section for generating the frame number;

a multiplexing section for multiplexing a digital signal scramble coded by the scramble coding processing section, the frame timing signal generated by the frame timing generating section, the frame number generated by the frame number generating section, and the CPU-to-CPU communication signal input from the CPU-to-CPU communication serial controller, for format conversion;

an IPDL timing generating section for generating a timing of switching on/off a data signal to an arbitrary RF signal processing unit among the plurality of RF signal processing units at an arbitrary chip timing;

IPDL on/off sections each for performing on/off control over the digital signal multiplexed and format converted by the multiplexing section for an arbitray segment on a chip basis based on the timing generated by the IPDL timing generating section;

high-speed digital signal coding sections each for performing coding processing on the multiplexed digital signal input from one of the IPDL on/off sections;

parallel-to-serial converting sections each for performing parallel-to-serial conversion on a digital signal coded by one of the high-speed digital signal coding sections, thereby converting the digital signal into a high-speed differential digital signal, for output to each of the plurality of RF signal processing units;

serial-to-parallel converting sections each for converting a serial signal input from the each of the plurality of RF signal processing units into parallel digital signals;

high-speed digital signal decoding sections each for performing decoding processing on received parallel digital signals converted by one of the serial-to-parallel converting sections; and a separating section for separating the received digital signals decoded by one of the high-speed digital signal decoding sections into a demodulated received digital signal and a CPU-to-CPU communication signal.

In the CDMA base station apparatus according a further aspect of the present invention, the cables are made up of optical cables; and the baseband signal processing unit further includes:

electrical-to-optical signal converting sections each for converting a digital signal parallel-to-serial converted by one of the parallel-to-serial converting sections into an optical signal, for outputting to each of the plurality of RF signal processing units through one of the optical cables; and optical-to-electrical signal converting sections each for converting the high-speed differential digital signal input from the each of the plurality of RF signal processing unit through one of the optical cables into an electrical signal, for outputting to one of the serial-to-parallel converting sections.

In the CDMA base station apparatus according to a still further aspect of the present invention, each of the plurality of RF signal processing units includes:

a serial-to-parallel converting section for performing parallel conversion on a high-speed differential digital signal input from the baseband signal processing unit through one of the cables, thereby converting the high-speed differential digital signal into a parallel digital signal (or signals);

a clock extracting section for extracting the reference clock from a parallel digital signals parallel-converted by the serial-to-parallel converting section;

a high-speed digital signal(s) decoding section for performing decoding processing on the parallel digital signal parallel-converted by the serial-to-parallel converting section;

a separating section for separating a digital signal decoded by the high-speed digital signal decoding section into a scramble coded digital signal and the CPU-to-CPU communication signal;

a modulating section for modulating the scramble coded digital signal separated by the separating section, for outputting to an RF unit for performing transmission to each mobile station;

a frame timing extracting section for extracting frame timing from the CPU-to-CPU communication signal separated by the separating section;

a frame number extracting section for extracting the frame number from the CPU-to-CPU communication signal separated by the separating section;

a CPU-to-CPU communication serial controller for generating the CPU-to-CPU communication signal for performing CPU-to-CPU serial communication with the CPU of the baseband signal processing unit;

a demodulating section for demodulating a received signal input from the RF unit;

a multiplexing section for format converting a digital signal demodulated by the demodulating section, the CPU-to-CPU communication signal input from the CPU-to-CPU communication serial controller, and the frame timing signal input from the frame timing extracting section;

a high-speed digital signal coding section for performing coding processing on a demodulated digital signal format converted by the multiplexing section; and a parallel-to-serial converting section for performing serial conversion on a digital signal format converted by the high-speed digital signal coding section, thereby converting the digital signal into the high-speed differential digital signal, for outputting onto one of the cables.

In the CDMA base station apparatus according to a yet further aspect of the present invention, the cables are made up of optical cables; and each of the plurality of RF signal processing units further includes:

an electrical-to-optical signal converting section for converting the digital signal parallel-to-serial converted by the parallel-to-serial converting section into an optical signal, for outputting to the baseband signal processing unit through one of the optical cables; and an optical-to-electrical signal converting section for converting the high-speed differential digital signal input from the baseband signal processing unit through one of the optical cables to an electrical signal, for outputting to the serial-to-parallel converting section.

PREFERRED EMBODIMENTS OF THE INVENTION

Next, an embodiment of the present invention will be described in detail with reference to the drawings.

Figure 1:
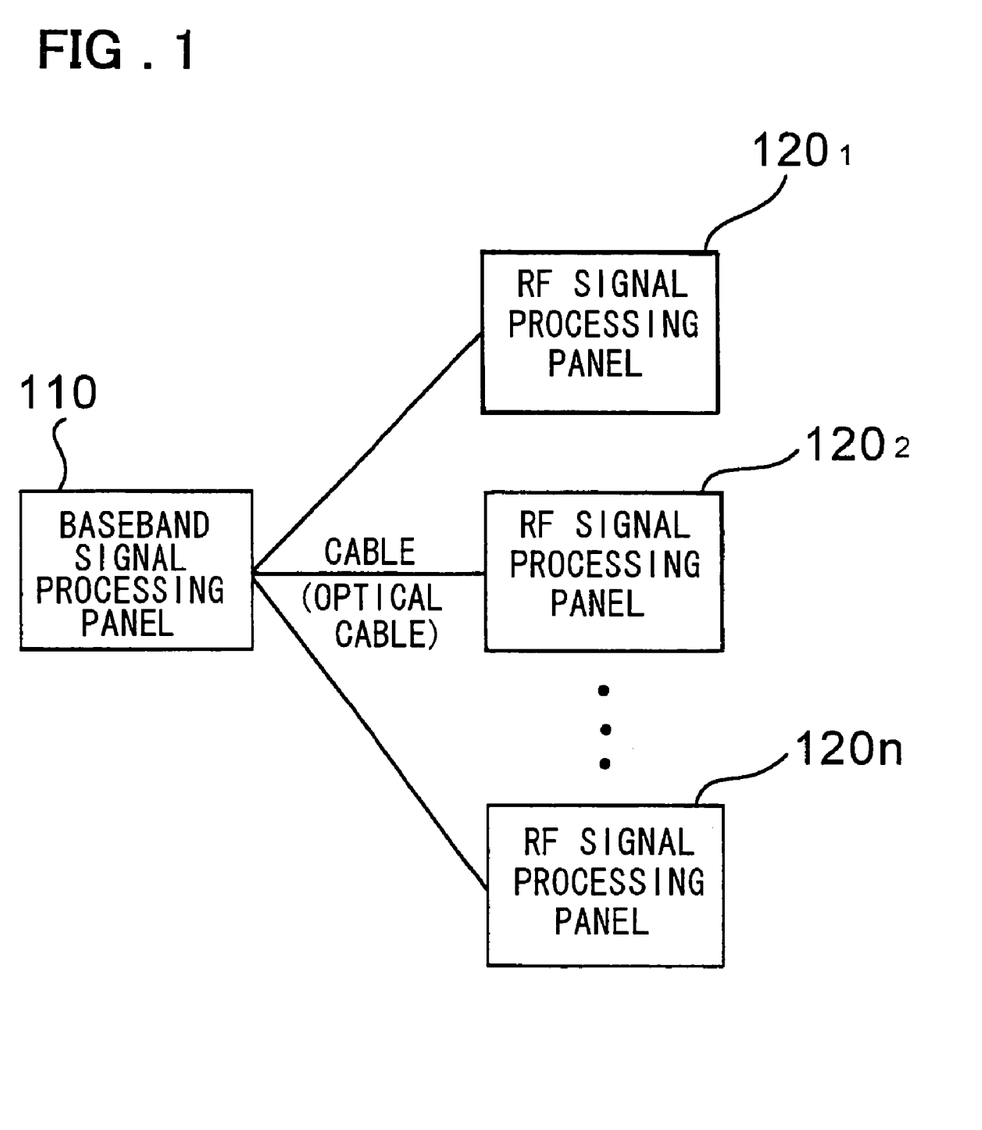
FIG. 1 is a system diagram showing a configuration of a W-CDMA base station apparatus according to an embodiment of the present invention.

FIG. 1 is a system diagram showing a configuration of a W-CDMA base station apparatus according to an embodiment of the present invention.

In the W-CDMA base station apparatus in this embodiment, a baseband signal processing panel (BB panel) 110 and each of n RF signal processing panels (RF panels) $120_1$ to $120_n$ are connected by a single duplex optical cable to perform high-speed digital signal transmission.

Figure 2:
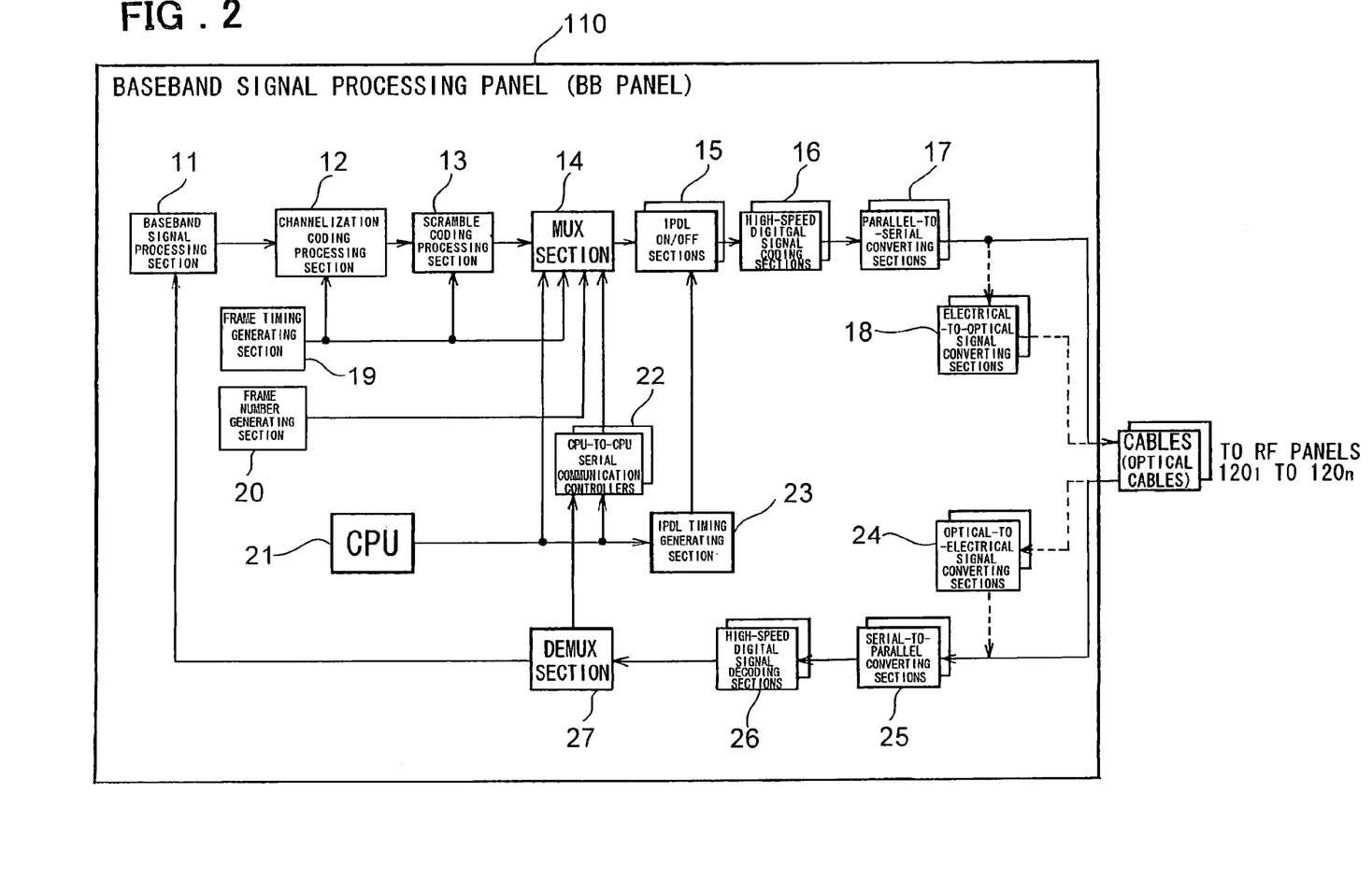
FIG. 2 is a block diagram showing a configuration of a baseband signal processing panel 110 in FIG. 1.

A configuration of the baseband signal processing panel (BB panel) 110 in FIG. 1 is shown in FIG. 2. As shown in FIG. 2, the baseband signal processing panel 110 is comprised of a baseband signal processing section 11, a channelization coding processing section 12, a scramble coding processing section 13, a CPU 21, CPU-to-CPU communication serial controllers 22, a frame timing generating section 19, a frame number generating section 20, an MUX (multiplexing) section 14, IPDL (Idle Period for Downlink) on/off sections 15, an IPDL timing generating section 23, high-speed digital signal coding sections 16, parallel-to-serial converting sections 17, electrical-to-optical signal converting sections 18, optical-to-electrical signal converting sections 24, serial-to-parallel converting sections 25, high-speed digital signal decoding sections 26, and a DEMUX (demultiplexing) section 27.

The channelization coding processing section 12, scramble coding processing section 13, MUX section 14, IPDL on/off sections 15, high-speed digital signal coding sections 16, parallel-to-serial converting sections 17, electrical-to-optical signal converting sections 18 make up a downward transmission system (downlink), while the optical-to-electrical signal converting sections 24, serial-to-parallel converting sections 25, high-speed digital signal decoding sections 26, and DEMUX section 27 make up an upward reception system (uplink).

The baseband signal processing section 11 performs baseband processing on digital data for downward transmission and baseband processing on digital data for upward reception. The channelization coding processing section 12 performs channelization coding on digital data for downward transmission, generated by the baseband signal processing section 11. The scramble coding processing section 13 performs scramble coding on digital data which has undergone channelization coding by the channelization coding processing section 12. The baseband processing comprises a digital signal processing part conducting channel coding. In other words it converts the sound data and the packet communication data into symbol data.

Each CPU-to-CPU communication serial controller 22 generates a CPU-to-CPU communication signal for performing CPU-to-CPU serial communication with respective CPUs of a plurality of RF panels $120_1$ to $120_n$ using a UART (Universal Asynchronous Receive Transmitter), HDLC (High Level Data Link Control) or the like. The frame timing generating section 19 generates a frame-timing signal. The frame number generating section 20 generates frame number.

The MUX section 14 multiplexes the digital signal scramble-coded by the scramble-coding processing section 13, frame timing signal generated by the frame timing generating section 19, frame number generated by the frame number generating section 20, and CPU-to-CPU communication signal supplied through one of the CPU-to-CPU communication serial controllers 22, for format conversion.

Each IPDL on/off section 15 performs on/off control on the digital signal multiplexed and format converted by the MUX section 14 for an arbitrary segment on a chip basis based on certain timing generated by the IPDL timing generating section 23. The IPDL timing generating section 23 is controlled by the CPU 21 and generates the timing of switching on/off a digital signal destined for any (arbitrary) one of the RF panels $120_1$ to $120_n$ at arbitrary chip timing.

Each high-speed digital signal coding section 16 performs coding processing on the multiplexed digital signal supplied from one of the IPDL on/off sections 15. Each parallel-to-serial converting section 17 performs parallel-to-serial conversion on the digital signal which has been coded by one of the high-speed digital signal coding sections 16, thereby converting the coded digital signal to a high-speed differential digital signal, for output. Each electrical-to-optical signal (E/O) converting section 18 converts the digital signal which has been parallel-to-serial converted by one of the parallel-to-serial converting sections 17 into an optical signal, for outputting onto an optical cable.

Each optical-to-electrical signal (O/E) converting section 24 converts a high-speed differential digital signal supplied from any one of the RF panels $120_1$ to $120_n$ through the optical cable to an electrical signal. Each serial-to-parallel (S/E) converting section 25 converts the serial signal that has been converted to the electrical signal by one of the optical-to-electrical signal converting sections 24 to parallel digital signals.

Each high-speed digital signal decoding section 26 decodes the received digital signals parallel-converted by one of the serial-to-parallel (S/P) converting sections 25. The DEMUX section 27 separates the received digital signals that have been decoded by the high-speed signal decoding section 26 into a demodulated received digital signal and the CPU-to-CPU communication signal.

Figure 3:
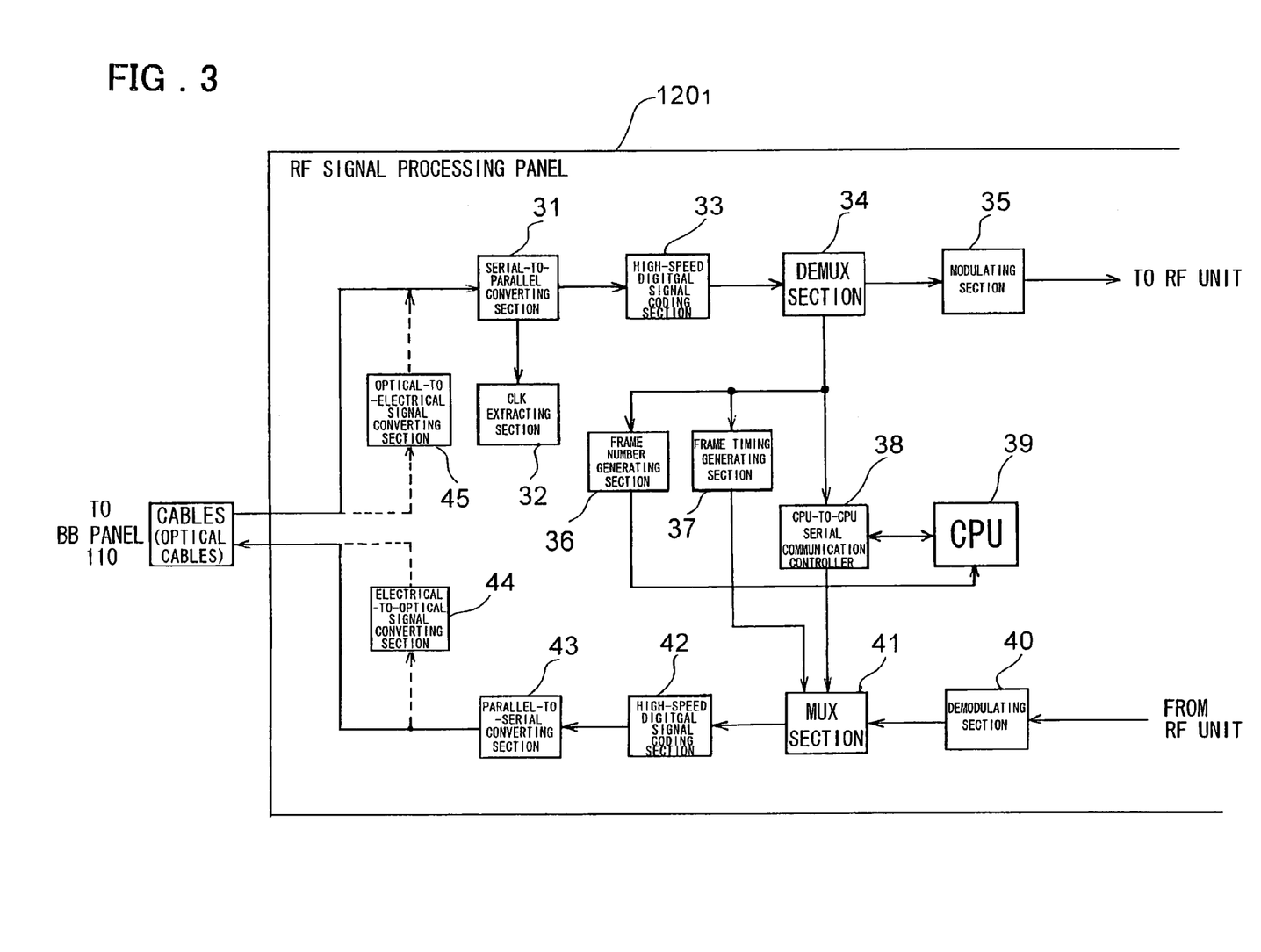
FIG. 3 is a block diagram showing a configuration of an RF signal processing panel $120_1$ in FIG. 1.

A configuration of one RF signal processing panel (RF panel) $120_1$ of the plurality of $120_1$ to $120_n$ in FIG. 1 is shown in FIG. 3. As shown in FIG. 3, the RF panel $120_1$ is comprised of a CPU 39, a CPU-to-CPU communication serial controller 38, an optical-to-electrical signal converting section 45, a serial-to-parallel converting section 31, a CLK (clock) extracting section 32, a high-speed digital signal decoding section 33, a DEMUX section 34, a modulating section 35, a frame timing extracting section 37, a frame number extracting section 36, a demodulating section 40, an MUX section 41, a high-speed digital signal coding section 42, a parallel-to-serial (P/S) converting section 43, and an electrical-to-optical (E/O) signal converting section 44.

The optical-to-electrical signal converting section 45, serial-to-parallel converting section 31, CLK (clock) extracting section 32, high-speed digital signal decoding section 33, DEMUX section 34, modulating section 35, frame timing extracting section 37, and frame number extracting section 36 make up a downward transmission system (downlink), while the demodulating section 40, MUX section 41, high-speed digital signal coding section 42, parallel-to-serial (P/S) converting section 43, and electrical-to-optical (E/O) signal converting section 44 make up an upward reception system (uplink).

The optical-to-electrical signal converting section 45 converts the high-speed differential digital signal input from the BB panel 110 through the optical cable into the electrical signal. The serial-to-parallel converting section 31 performs serial-to-parallel conversion on the high-speed differential digital signal input from the BB panel 110 through the cable, thereby converting the high-speed differential digital signal to parallel digital signal. The CLK extracting section 32 extracts a reference CLK from the parallel digital signal that has been parallel-converted by the serial-to-parallel converting section 31.

The high-speed digital signal decoding section 33 decodes the digital signal that has been parallel-converted by the serial-to-parallel converting section 31. The DEMUX section 34 separates the digital signal that has been decoded by the high-speed digital signal decoding section 33 into the scramble coded digital signal and the CPU-to-CPU communication signal.

The modulating section 35 modulates the scramble decoded digital signal separated by the DEMUX section 34 and outputs the modulated signal to an RF section for performing transmission to each of mobile stations. The frame timing extracting section 37 extracts frame timing from the CPU-to-CPU communication signal separated by the DEMUX section 34. The frame number extracting section 36 extracts the frame number from the CPU-to-CPU communication signal separated by the DEMUX section 34.

The CPU-to-CPU communication serial controller 38 generates the CPU-to-CPU communication signal for performing the CPU-to-CPU serial communication with the CPU of the BB panel 110 using the UART, HDLC, or the like.

The demodulating section 40 demodulates a received signal supplied from the RF unit. The MUX section 41 performs format conversion on the digital signal demodulated by the demodulating section 40, the CPU-to-CPU communication signal supplied from the CPU-to-CPU communication serial controller 38, and the frame timing signal supplied from the frame timing extracting section 37.

The high-speed digital signal coding section 42 performs coding processing on the demodulated digital signal that has been format-converted by the MUX section 41. The parallel-to-serial converting section 43 performs serial conversion on the digital signal that has been format-converted by the high-speed digital signal coding section 42 and converts the resulting signal to the high-speed differential digital signal, for outputting onto the cable. The electrical-to-optical signal converting section 44 converts the digital signal that has been serial-converted by the parallel-to-serial converting section 43 to the optical signal, for output onto the optical cable.

Next, an operation of the W-CDMA base station apparatus in this embodiment will be described in detail with reference to the drawings.

First, an operation of the downward transmission system in the baseband signal-processing panel 110 will be described with reference to FIG. 2.

In the downward transmission system, digital data for downward transmission, generated by the baseband signal processing section 11 undergoes channelization coding by the channelization coding section 12, and then scramble coded by the scramble coding processing section 13. The scramble coded digital signal is output to the MUX section 14.

The MUX section 14 can select to which RF panel of the plurality of RF panels $120_1$ to $120_n$ connected by a plurality of cables the input digital signal should be directed, under control of the CPU 21. The MUX section 14 also has a multicast function of outputting the same scramble coded digital signal to the plurality of RF panels $120_1$ to $120_n$. Further, to the MUX section 14, the frame timing signal generated by the frame timing generating section 19 and the frame number generated by the frame number generating section 20 are input.

Further, the CPU-to-CPU communication signal for performing the CPU-to-CPU communication serial communication with each of the CPUs 39 of the plurality of RF panels $120_1$ to $120_n$ using the UART, HDLC, or the like is input to the MUX section 14 through the CPU-to-CPU communication serial controllers 22, and format-converted. On this occasion, a special code for coding for high-speed digital communication can also be assigned to the frame-timing signal. When 8b/10b coding is employed as a high-speed digital communication coding method, a comma code can be used for the frame timing. For transmission of different reference timings such as the ones for frame timing recognition and chip timing recognition, use of different comma codes also becomes possible. The frame number and the CPU-to-CPU communication signal are periodically inserted and transmitted using the frame-timing signal as references.

The digital signal that has been multiplexed and format-converted by the MUX section 14 is output to the high-speed signal coding section 16 (such as an 8b/10b coding circuit) through the IPDL on/off section 15. The CPU 21 controls the IPDL timing generating section 23 for generating the timing of switching on/off the digital signal to any arbitrary RF panel at an arbitrary chip timing, thereby allowing on/off control of the IPDL on/off section 15 for an arbitrary segment on a chip basis.

The high-speed digital signal coding section 16 performs coding (such as 8b/10b coding) on the input multiplexed digital signal and outputs the resulting signal to the parallel-to-serial converting section (SerDes) 17.

The parallel-to-serial converting section 17 performs parallel-to-serial conversion on the multiplexed digital signal to obtain the high-speed differential digital signal such as the LVDS (Low Voltage Differential Signaling), LVPECL (low-voltage positive/pseudo emitter-coupled logic), or the like and outputs the converted signal to the cables interfacing the RF panels $120_1$ to $120_n$. The high-speed differential digital signal/signals is/are transmitted to the connected RF panels $120_1$ to $120_n$ through the respective (duplex) cables. When distances between the BB panel 110 and the respective RF panels $120_1$ to $120_n$ are long, the digital signal that has been parallel-to-serial converted can also be converted to the optical signal by the electrical-to-optical signal converting section 18 and transmitted using optical cables.

Next, an operation of the RF signal processing panels (RF panels) $120_1$ to $120_n$ will be described. For the following description, the operation of the RF panel $120_1$ will be described.

In the downward transmission system of the RF panel $120_1$, the high-speed differential digital signal input from the BB panel 110 through the cable is converted to the parallel digital signal by the serial-to-parallel converting section (SerDes) 31. The reference CLK is extracted by the received CLK extracting section 32. The digital signal that has been parallel-converted is decoded by the high-speed digital signal decoding section 33. The DEMUX section 34 separates the decoded signal into the scramble coded digital signal and the CPU-to-CPU communication signal. The frame timing is extracted by the frame timing extracting section 37 for use in a subsequent stage, and is used as the frame-timing signal for the upward (uplink) reception system. The frame number extracting section 36 extracts the frame number, for outputting to the CPU 39. The scramble coded digital signal separated by the DEMUX section 34 is modulated by the modulating section 35, for output to the RF unit (mainly constituted from an AMP). The CPU-to-CPU communication signal separated by the DEMUX section 34 is output to the CPU 39 through the CPU-to-CPU communication serial controller 38.

In the upward reception system for the RF panel $120_1$, the received signal input from the RF unit is demodulated by the demodulating section 40, and then output to the MUX section 41. The MUX section 41 performs format conversion on the demodulated digital signal, the CPU-to-CPU communication signal input from the CPU-to-CPU communication serial controller 38, and the frame timing signal input from the frame timing extracting section 37. In this case, as in the transmission system, the special code for the high-speed digital signal can also be employed for the frame timing. The demodulated digital signal that has been format converted undergoes coding (such as 8b/10b coding) by the high-speed digital signal coding section 42, and output to the parallel-to-serial converting section 43. The parallel-to-serial converting section (SerDes) 43 performs serial conversion on the coded signal, thereby converting the coded signal to the high-speed differential digital signal, for output onto the cable. The output high-speed differential digital signal is output to the BB panel 110 using the same duplex cable as the one for the transmission system. When the distances between the BB panel 110 and the respective RF panels $120_1$ to $120_n$ are long, the received digital signal that has been serial converted can also be converted to the optical signal by the electrical-to-optical signal converting section 44 and output to the BB panel 110 through the optical cable, as in the transmission system.

Finally, an operation of the upward (uplink) reception system in the baseband signal processing panel 110 will be described with reference to FIG. 2.

In the baseband signal processing panel 110, the high-speed differential digital signal input from the RF panel $120_1$ through the cable is input to the serial-to-parallel converting section 25. When the high-speed differential digital signal is input through the optical cable, the input signal is converted to the electrical signal at the optical-to-electrical signal (O/E) converting section 24, and then input to the serial-to-parallel converting section 25. The serial-to-parallel converting section 25 converts the serial signal to the parallel digital signal, for outputting to the high-speed digital signal decoding section 26. The high-speed digital signal decoding section 26 decodes the input parallel converted digital signal, for output to the DEMUX section 27. The DEMUX section 27 performs separation into the received digital signal that has been demodulated and the CPU-to-CPU communication signal. The received digital signal that has been demodulated and separated is output to the baseband signal processing section 11.

The separated CPU-to-CPU communication signal is output to the CPU 21 through the CPU-to-CPU communication serial controllers 22. By connecting the BB panel 110 to each of the plurality of RF panels $120_1$ to $120_n$ by a single duplex cable, respectively, as described above, transmission of the baseband signal, CPU-to-CPU communication signal, frame timing signal, and frame number can be achieved.

According to the W-CDMA base station apparatus in this embodiment, the BB panel 110 and each of the plurality of RF panels $120_1$ to $120_n$ are connected by a single cable, and interfacing by a bi-directional high-speed digital signal is possible.

In the BB panel 110 for performing baseband signal processing, after channelization coding processing and scramble coding processing of the baseband signal has been performed, format conversion for interfacing with the RF panels $120_1$ to $120_n$ is performed by the MUX section 14. The MUX section 14 can arbitrarily switch the RF panel for transmission among the plurality of RF panels $120_1$ to $120_n$ connected thereto under control of the CPU 21. The MUX section 14 also has the multicast function of transmitting the same baseband signal to the plurality of RF panels $120_1$ to $120_n$.

In this embodiment, the CPU 21 of the BB panel 110 and CPUs 39 of the RF panels $120_1$ to $120_n$ can perform the CPU-to-CPU serial communication using the UART (Universal Asynchronous Receive Transmitter), HDLC (High Level Data Link Control), or the like through the same cable. For this reason, the MUX section 14 can multiplex the baseband signal and the CPU-to-CPU communication signal that have been channelization coded and scramble coded, and further, the frame timing signal, frame number, and reference CLK in the apparatus.

The multiplexed baseband signal undergoes coding such as the 8b/10b coding in order to perform high-speed digital signal transmission. When the 8b/10b coding is performed, the comma command can be used for the frame timing, and different comma codes can also be used for transmission of different reference timings such as the ones for frame recognition and chip recognition.

The coded digital signal is converted to the high-speed differential digital signal by the parallel-to-serial converting section 17 such as the SerDes, and transmitted to the RF panel $120_1$ to $120_n$ through the cables. Further, conversion of the high-speed digital signal to light and optical transmission using the optical cable are also possible.

Further, the function of switching on/off the baseband signal for an arbitrary RF panel of the RF panels $120_1$ to $120_n$ for an arbitrary segment individually on the chip basis under the control of the CPU 21 is included as an IPDL function.

In the RF panels $120_1$ to $120_n$, the high-speed digital signal that has been sent is serial-to-parallel converted by the serial-to-parallel converting section 31 such as the SerDes, and separated into the baseband signal and the CPU-to-CPU communication signal by the DEMUX section 34. Further, the same processing as in the transmission side is performed on the received signal, and high-speed digital transmission of the demodulated digital signal is performed.

According to the W-CDMA base station apparatus, in the baseband signal processing panel 110, the CPU-to-CPU communication signal, frame timing signal, signals indicating the frame number, reference clock, and the like are multiplexed into the baseband signal and transmitted to the RF panels $120_1$ to $120_n$. In the RF panels $120_1$ to $120_n$, signals such as the frame-timing signal and the CPU-to-CPU communication signal are multiplexed into the demodulated digital signal, for transmission to the BB panel 110. Accordingly, a special circuit is not required, so that the CPU-to-CPU serial communication using the UART, HDLC, or the like becomes possible. Status monitoring of and various controls over the counterpart panel can be easily performed, so that any other physical interface is not required. Transmission of the frame timing signal, frame number, and reference clock used as references between the baseband signal processing unit and the plurality of RF signal processing units becomes possible.

In the W-CDMA base station apparatus in this embodiment, the description was directed to a case where the BB panel 110 and the plurality of RF panels $120_1$ to $120_n$ are connected using the optical cables. The present invention is not limited to this. The present invention can also be applied to a case where the BB panel 110 and the plurality of RF panels $120_1$ to $120_n$ are connected using ordinary cables for transmitting an electrical signal. In this case, the electrical-to-optical signal converting sections 18 and the optical-to-electrical signal converting sections 24 in the BB panel 110 and electrical-to-optical signal converting sections 44 and optical-to-electrical signal converting sections 45 in the RF panels $120_1$ to $120_n$ naturally become unnecessary.

In this embodiment, though the description is directed to a case where the W-CDMA base station apparatus is used as an example of a CDMA base station apparatus, the present invention is not limited to this case and can also be applied to the CDMA base station apparatus according to other system, similarly.

Further, in this embodiment, in the baseband signal processing panel 110, the description is directed to a case where all the signals such as the CPU-to-CPU communication signal, frame timing signal, frame number, and reference clock are multiplexed with the baseband signal and transmitted to the RF panels $120_1$ to $120_n$. However, at least one of these signals may be multiplexed with the baseband signal and may be transmitted to the RF panels $120_1$ to $120_n$. Likewise, in the RF panels $120_1$ to $120_n$ in this embodiment, the description is directed to a case where all the signals such as the frame timing signal, CPU-to-CPU communication signal, and the like are transmitted to the BB panel 110. However, at least one of these signals may be multiplexed with the demodulated digital signal and then may be transmitted to the BB panel 110.

The meritorious effects of the present invention are summarized as follows.

As described above, according to the present invention, following effects can be obtained:

(1) Without a special circuit between the baseband signal processing unit and the plurality of RF signal processing units, the CPU-to-CPU serial communication using the UART, HDLC, or the like becomes possible. Thus, status monitoring of and various controls over the counterpart panel can be easily performed.

(2) Other physical interface is not required, so that transmission of the frame timing signal, frame number and/or the reference clock, used as reference becomes possible between the baseband signal processing unit and the plurality of RF signal processing units.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A CDMA base station apparatus comprising a baseband signal processing unit performing baseband signal processing and a plurality of RF signal processing units each performing RF signal processing;

wherein said baseband signal processing unit and said plurality of RF signal processing units are connected by cables transmitting a digital signal bidirectionally;

said baseband signal processing unit multiplexes at least one signal of a CPU-to-CPU communication signal, a frame timing signal, frame number, and a reference clock with a baseband signal, for transmission to each of said plurality of RF signal processing units; and said plurality of RF signal processing units each multiplexes at least one signal of the frame timing signal and the CPU-to-CPU communication signal with a demodulated digital signal, for transmission to said baseband signal processing unit.

2. The CDMA base station apparatus according to claim 1, wherein said baseband signal processing unit comprises:

a baseband signal processing section performing baseband processing on digital data for downward transmission and baseband processing on digital data for upward transmission;

a channelization coding processing section performing channelization coding on digital data for downward transmission, generated by said baseband signal processing section;

a scramble coding processing section performing scramble coding on digital data which has undergone channelization coding by said channelization coding processing section;

a CPU-to-CPU communication serial controller generating the CPU-to-CPU communication signal for performing CPU-to-CPU serial communication with respective CPUs of said plurality of RF signal processing units;

a frame timing generating section generating the frame timing signal;

a frame number generating section generating the frame number;

a multiplexing section multiplexing a digital signal scramble coded by said scramble coding processing section, the frame timing signal generated by said frame timing generating section, the frame number generated by said frame number generating section, and the CPU-to-CPU communication signal input from said CPU-to-CPU communication serial controller, for format conversion;

an IPDL timing generating section generating a timing of switching on/off a data signal to an arbitrary RF signal processing unit among said plurality of RF signal processing units at an arbitrary chip timing;

IPDL on/off sections each performing on/off control over the digital signal multiplexed and format converted by said multiplexing section for an arbitrary segment on a chip basis based on the timing generated by said IPDL timing generating section;

high-speed digital signal coding sections each performing coding processing on the multiplexed digital signal input from one of said IPDL on/off sections;

parallel-to-serial converting sections each performing parallel-to-serial conversion on a digital signal coded by one of said high-speed digital signal coding sections, thereby converting the digital signal into a high-speed differential digital signal, for output to said each of said plurality of RF signal processing units;

serial-to-parallel converting sections each converting a serial signal input from said each of said plurality of RF signal processing units into a parallel digital signal;

high-speed digital signal decoding sections each for performing decoding processing on the received parallel digital signal converted by one of said serial-to-parallel converting sections; and a separating section separating the received digital signal decoded by one of said high-speed digital signal decoding sections into a demodulated received digital signal and a CPU-to-CPU communication signal.

3. The CDMA base station apparatus according to claim 2, wherein said cables comprise optical cables; and said baseband signal processing unit further comprises:

electrical-to-optical signal converting sections each converting a digital signal parallel-to-serial converted by one of said parallel-to-serial converting sections into an optical signal, for outputting to said each of said plurality of RF signal processing units through one of said optical cables; and optical-to-electrical signal converting sections each converting the high-speed differential digital signal input from said each of the plurality of RF signal processing units through said one of said optical cables into an electrical signal, for outputting to one of said serial-to-parallel converting sections.

4. The CDMA base station apparatus according to claim 1, wherein said each of said plurality of RF signal processing units comprises:

a serial-to-parallel converting section performing parallel conversion on a high-speed differential digital signal input from said baseband signal processing unit through one of said cables, thereby converting the high-speed differential digital signal into a parallel digital signal;

a clock extracting section extracting the reference clock from a parallel digital signal parallel-converted by said serial-to-parallel converting section;

a high-speed digital signal decoding section performing decoding processing on the parallel digital signal parallel-converted by said serial-to-parallel converting section;

a separating section separating a digital signal decoded by said high-speed digital signal decoding section into a scramble coded digital signal and the CPU-to-CPU communication signal;

a modulating section modulating the scramble coded digital signal separated by said separating section, for outputting to an RF unit for performing transmission to each of mobile stations;

a frame timing extracting section extracting frame timing from the CPU-to-CPU communication signal separated by said separating section;

a frame number extracting section extracting the frame number from the CPU-to-CPU communication signal separated by said separating section;

a CPU-to-CPU communication serial controller generating the CPU-to-CPU communication signal for performing CPU-to-CPU serial communication with a CPU of said baseband signal processing unit;

a demodulating section demodulating a received signal input from said RF unit;

a multiplexing section format-converting a digital signal demodulated by said demodulating section, the CPU-to-CPU communication signal input from said CPU-to-CPU communication serial controller, and the frame timing signal input from said frame timing extracting section;

a high-speed digital signal coding section performing coding processing on a demodulated digital signal format converted by said multiplexing section; and a parallel-to-serial converting section performing serial conversion on a digital signal format converted by said high-speed digital signal coding section, thereby converting the digital signal into the high-speed differential digital signal, for outputting onto said one of said cables.

5. The CDMA base station apparatus according to claim 4, wherein said cables comprise optical cables; and said each of said plurality of RF signal processing units further comprises:

an electrical-to-optical signal converting section converting the digital signal parallel-to-serial converted by said parallel-to-serial converting section into an optical signal, for outputting to said baseband signal processing unit through one of said optical cables; and an optical-to-electrical signal converting section converting the high-speed differential digital signal input from said baseband signal processing unit through said one of said optical cables to an electrical signal, for outputting to said serial-to-parallel converting section.

6. The CDMA base station apparatus according to claim 1, wherein said baseband signal processing unit is directly connected by said cables to said plurality of RF signal processing units.

* * * * *